United States Patent
De Kievit et al.

(10) Patent No.: US 10,251,210 B2
(45) Date of Patent: Apr. 2, 2019

(54) INFRASTRUCTURE-BASED D2D CONNECTION SETUP USING OTT SERVICES

(71) Applicants: Koninklijke KPN N.V., The Hague (NL); Nederlandse Organisatie voor Toegepast-Natuurwetenschappelijk Onderzoek TNO, s-Gravenhage (NL)

(72) Inventors: Sander De Kievit, Leiden (NL); José Almodóvar Chico, Delft (NL); Antonius Norp, The Hague (NL); Bernardus Hillen, Zoetermeer (NL)

(73) Assignees: Koninklijke KPN N.V., Rotterdam (NL); Nederlandse Organisatie voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 0 days.

(21) Appl. No.: 15/528,655

(22) PCT Filed: Nov. 27, 2015

(86) PCT No.: PCT/EP2015/077932
§ 371 (c)(1),
(2) Date: May 22, 2017

(87) PCT Pub. No.: WO2016/083580
PCT Pub. Date: Jun. 2, 2016

(65) Prior Publication Data
US 2017/0265246 A1    Sep. 14, 2017

(30) Foreign Application Priority Data
Nov. 27, 2014    (EP) .................................. 14195052

(51) Int. Cl.
H04W 88/16    (2009.01)
H04W 92/02    (2009.01)
(Continued)

(52) U.S. Cl.
CPC ............. *H04W 76/23* (2018.02); *H04L 63/02* (2013.01); *H04L 63/0209* (2013.01);
(Continued)

(58) Field of Classification Search
CPC ............. H04W 4/003; H04W 72/1215; H04W 76/043; H04W 84/042; H04W 88/16;
(Continued)

(56) References Cited

U.S. PATENT DOCUMENTS

| 2008/0107068 A1* | 5/2008 | Kitahama ........... H04L 63/0263 370/328 |
| 2011/0258327 A1 | 10/2011 | Phan et al. |
| 2014/0313902 A1 | 10/2014 | Bruner et al. |

FOREIGN PATENT DOCUMENTS

| EP | 1 424 828 A2 | 6/2004 |
| EP | 1 424 828 A3 | 6/2006 |

(Continued)

OTHER PUBLICATIONS

European Search Report, European Patent Application No. 14195052.7 dated May 12, 2015, 12 pages.
(Continued)

*Primary Examiner* — Philip Sobutka
(74) *Attorney, Agent, or Firm* — McDonnell Boehnen Hulbert & Berghoff LLP

(57) ABSTRACT

Methods and systems enabling the end users of cellular devices to set up infrastructure-based D2D connections with other devices from within the over-the-top (OTT) applications running on their devices are disclosed. The methods are based on dynamically reconfiguring respective network-level firewalls protecting different end user devices.

13 Claims, 6 Drawing Sheets

(51) Int. Cl.

| | |
|---|---|
| *H04W 40/02* | (2009.01) |
| *H04W 8/20* | (2009.01) |
| *H04W 8/18* | (2009.01) |
| *H04W 48/18* | (2009.01) |
| *H04W 40/34* | (2009.01) |
| *H04W 76/23* | (2018.01) |
| *H04W 76/14* | (2018.01) |
| *H04W 4/60* | (2018.01) |
| *H04L 29/06* | (2006.01) |
| *H04W 72/12* | (2009.01) |
| *H04L 29/12* | (2006.01) |
| *H04W 84/04* | (2009.01) |

(52) U.S. Cl.
CPC ............... *H04L 63/20* (2013.01); *H04W 4/60* (2018.02); *H04W 72/1215* (2013.01); *H04W 76/14* (2018.02); *H04L 61/6068* (2013.01); *H04W 84/042* (2013.01); *H04W 88/16* (2013.01)

(58) Field of Classification Search
CPC ..... H04W 76/023; H04W 4/22; H04W 76/02; H04W 76/025; H04W 40/02; H04W 48/18; H04W 64/00; H04W 8/26; H04W 36/0022; H04W 72/0406; H04W 72/0426; H04W 88/18; H04W 40/34
USPC ......................................................... 455/445
See application file for complete search history.

(56) References Cited

FOREIGN PATENT DOCUMENTS

| | | |
|---|---|---|
| WO | 2014/114711 A1 | 7/2014 |
| WO | 2015/059286 A1 | 4/2015 |

OTHER PUBLICATIONS

PCT International Search Report and Written Opinion, PCT International Application No. PCT/EP2015/077932, dated Jan. 29, 2016, 15 pages.

KPN, "Discussion on Device-To-Device Communication", 3GPP Draft: S1-133088, 3rd Generation Partnership Project (3GPP), Mobile Competence Centre, vol. SA WG1, No. New Delhi, India, May 6-10, 2013, retrieved from internet Apr. 26, 2013, 2 pages.

KPN, "Draft WID on Infrastructure Based Device-to-Device Communication", 3GPP Draft; S1-134042, updated on WID Device-to-Device Communication V2, 3rd Generation Partnership Project (3GPP), Mobile Competence Centre, vol. SA WG1, No. Zagreb, Croatia, Aug. 19-23, 2013, retrieved from internet Oct. 15, 2013, 5 pages.

"3rd Generation Partnership Project; Technical Specification Group Services and System Aspects; Feasibility Study for Proximity Service (ProSe) (Release 12)", 3GPP TR 22.803 V12.2.0, (Jun. 2013), pp. 1-45.

3rd Generation Partnership Project: Technical Specification Group Services and System Aspects; Study on Enhancements for Infrastructure-Based Data Communication Between Devices (Release 13), 3GPP TR 22.807 V13.0.0 (Sep. 2014), pp. 1-22.

"3rd General Partnership Project; Technical Specification Group Services and Systems Aspects; Network Architecture (Release 12)", 3GPP TS 23.002 V.12.5.0, Jun. 2014, pp. 1-109.

"3rd General Partnership Project; Technical Specification Group Services and System Aspects; General Packet Radio Service (GPRS) Enhancements for Evolved Universal Terrestrial Radio Access Network (E-UTRAN) Access (Release 13)", 3GPP TS 23.401 V13.0.0, Sep. 2014, pp. 1-308.

"3rd Generation Partnership Project; Technical Specification Group Services and System Aspects; Proximity-based Services (ProSe); Stage 2, (Release 12)", 3GPP TS 23.303 V12.2.0, Sep. 2014, pp. 1-61.

\* cited by examiner

INFRASTRUCTURE-BASED D2D CONNECTION SETUP USING OTT SERVICES

CROSS REFERENCE TO RELATED APPLICATIONS

The present application is a national stage entry of PCT/EP2015/077932, filed Nov. 27, 2015, and claims priority to EP 14195052.7, filed Nov. 27, 2014. The full disclosures of EP 14195052.7 and PCT/EP2015/077932 are incorporated herein by reference.

FIELD OF INVENTION

The disclosure generally relates to the field of telecommunications networks. In particular, though not necessarily, the disclosure relates to methods, systems, and computer program products for dynamically reconfiguring the telecommunications networks for an infrastructure-based device-to-device (D2D) communication between a first and a second device connected to a telecommunications network.

BACKGROUND

In the future, communications between pairs of devices are likely to increase. Examples of such communications can be found in the increased application of connectivity of household devices such as game consoles, televisions, and heating systems as well as in the recent addition of tablet computers and smart phones. Some of these devices are capable of sending and receiving data over a direct data connection between them for a variety of purposes, such as e.g. using a smart phone or a tablet computer to control a television or a heating system, wirelessly transferring images and motion pictures from a camera to a laptop or a personal computer (PC), etc. Presently such communications are typically implemented by connecting both of the devices to the same network, such as a wired or wireless home or office network. Since this is not always possible or desirable, for data exchange between two devices that are not in the same network, the devices have to utilize an online service for relaying the data, which may also be undesirable at times.

Often, devices that would be advantageous to engage in a direct communication with one another without being connected to a common local network and without using an online service are devices connected to a cellular telecommunications network. A technique has been developed, known as "proximity services" or "direct mode", that enables a direct data connection between two cellular devices utilizing radio resources allocated for that purpose. Whereas conventional cellular devices utilize the network infrastructure of one or more telecommunications networks, the infrastructure comprising at least a base station to communicate with each other, a characteristic of direct mode communication between such devices is that they can establish direct wireless data connections with each other without the need for user data to traverse the network infrastructure.

It would be desirable to enable device-to-device (D2D) communication between two cellular devices which are not in the proximity of one another as is required by the direct mode communication described above and also not in the same local network. One factor that makes such communication difficult to achieve for cellular devices is that cellular devices might be subscribed to different mobile network operators and, therefore, be behind different firewalls. Even for devices that are in the same mobile operator network, security regulations might prevent that two devices communicate directly. A trivial solution to this problem would be to remove the firewalls and make every device addressable directly from both inside and outside the operator network. A problem that could then occur is that the operator, and, consequently, the user of the device, will not have control over the data that is allowed to reach the device. For example, a malicious website or hacker could then keep on sending data to certain devices, which could result in that the end users will be facing high bills for data usage or/and the network operator will not be able to charge for the unsolicited data, leading to a loss to the operator.

It would also be desirable that, in order for two software applications on two cellular devices to exchange data, the devices and the applications should be aware that a connection between the devices is available and that they should either expect data packets or can send data packets over this connection. Preferably, a technique that allows such communication would be seamless and easy to use for both application developers and end users of the devices.

What is needed in the art is a technique enabling an establishment of a connection between two cellular devices connected to the same or different telecommunications network(s) of a single mobile operator or telecommunication networks of different mobile network operators in a manner that can address at least some of the issues described above.

SUMMARY

To address one or more of the issues described above, a technique that is referred to herein as an "infrastructure-based D2D communication" is proposed, where the term "infrastructure-based D2D communication" refers to discovering and setting up of a direct data connection between two devices in order to enable data exchange as if these devices were located in the same network. In other words, infrastructure-based D2D communication allows devices to directly exchange data packets, such as for example Transmission Control Protocol (TCP)/Internet Protocol (IP) and User Datagram Protocol (UDP)/IP packets over a connection established for that purpose, the connection referred to herein as an "infrastructure-based D2D connection". In the following, unless otherwise specified, the terms "communication" and "connection" refer to infrastructure-based D2D communication and connection, respectively.

In the most general case, the devices are connected to telecommunications networks of different mobile network operators (MNOs). However, in various individual cases the devices may be connected to two different telecommunications networks of a single MNO as well as to the same telecommunications network of a single MNO.

In one aspect of the present invention, a computer-implemented method for a first routing entity controlled by a first mobile network operator (MNO A) to enable establishment of an infrastructure-based D2D connection between a first device connected to a telecommunications network of the first mobile network operator and a second device connected to a telecommunications network of a second mobile network operator (MNO B) is proposed. Such devices could be any smart devices or terminals, preferably mobile terminals, in standardization more formally known as "User Equipment" (UE) or "Mobile Station" (MS) and sometimes also referred to simply as "users", "terminals", or "cellular devices". Such devices may also comprise devices such as laptops, tablets, smart watches, smart glasses etc. The method includes steps, performed by the first routing entity, of receiving from the first device a connection request comprising a first identifier for the second device, resolving the received first identifier of the second device into a second identifier of the second device identifying a second routing entity controlled by the second mobile network operator (MNO B), and using the second identifier to contact the identified second routing entity by providing to the second routing entity a connection request for the connection between the first device and the second device, the connection request comprising the first identifier or/and the second identifier of the second device. The method may further include steps of providing to the second routing entity contact information of the first device, receiving from the second routing entity contact information of the second device, and configuring a first firewall for a data exchange over the infrastructure-based D2D connection between the first device and the second device in accordance with the contact information of the first device and the contact information of the second device. The first firewall is a firewall of the telecommunications network to which the first device is connected (i.e. it is different from a firewall which may be implemented on the first device itself), the first firewall being configured to function as a firewall of the first device (i.e. being configured to protect the first device).

In another aspect of the present invention, a computer-implemented method to be performed by the second routing entity as described above is also disclosed. The method includes steps, performed by the second routing entity, of receiving from the first routing entity a connection request for the connection between the first device and the second device, the connection request comprising, as described above, a first identifier or/and a second identifier of the second device, resolving the received first identifier or/and the second identifier of the second device to determine a third identifier of the second device, and using the determined third identifier to contact the second device by providing the connection request, or a derivative thereof, to the second device identified by the determined third identifier. The method may further include steps of receiving from the first routing entity contact information of the first device, optionally receiving from the second device an indication that the second device accepts the connection request, providing contact information of the second device to the first routing entity, and configuring a second firewall for a data exchange over the infrastructure-based D2D connection between the first device and the second device in accordance with the contact information of the first device and the contact information of the second device. The second firewall is a firewall of the telecommunications network to which the second device is connected (i.e. it is different from a firewall which may be implemented on the second device itself), the second firewall being configured to function as a firewall of the second device (i.e. being configured to protect the second device).

In the following, for reasons of brevity, the first and second firewalls are referred to as firewalls of the first and second devices, respectively. However, in line with the explanations of these firewalls provided above, it is to be understood that these firewalls refer to network-level firewalls (i.e., firewalls controlled by the telecommunications network and/or MNO) as oppose to firewalls implemented on and controlled by the devices themselves.

In the following, the methods performed by the first and second routing entities are described for the most general case by reference to the first and second devices connected to respective telecommunications networks of different mobile network operators. However, the methods described herein are equally applicable to a particular case where the first and second devices are connected to the same telecommunications network of the same mobile network operator as well as to a particular case where the first and second devices are connected to different telecommunications networks of the same mobile network operator. In other words, as used in the claims, the first mobile network operator could be, but does not have to be, the same as the second mobile network operator, and, in case the first mobile network operator is the same as the second mobile network operator, the telecommunications network to which the first device is connected could be, but does not have to be, the same as the telecommunications network to which the second device is connected.

As used herein the term "first identifier" refers to an application-level identifier used by Over-The-Top applications (such as e.g. Facebook, Twitter, etc.) on a smart cellular device and on the internet. Some examples of application-level identifiers include, but are not limited to, login names, names of friends, a string of numbers generated by an online application identifying a specific user, email addresses, etc.

As used herein, the term "second identifier" refers to a network-level identifier used by a mobile network operator (MNO). Some examples of network-level identifiers include, but are not limited to, International Mobile Subscriber Identity (IMSI), Mobile Station International Subscriber Directory Number (MSISDN), universal resource identifier (URI), etc. These network-level identifiers are generally structured such that they identify to which mobile network operator or domain, the network-level identifier belongs. Consequently, the network-level identifier may be used to identify and contact the routing entity controlled by the identified mobile network operator.

As used herein, the term "third identifier" refers to an identifier that the second network uses internally to address and/or route traffic to the second device. The exact form of such an identifier, e.g. IMSI, Temporary Mobile Subscriber Identity (TMSI), IP address, a sip address, or International Mobile Equipment Identity (IMEI), depends on the implementation of the network.

Embodiments of the present invention are based on the insight that it would be desirable for the end users of cellular devices to be able to setup infrastructure-based D2D connections with other devices from within the OTT applications running on their devices, i.e. the OTT applications should be in command of setting up such connections. For example, if Mary would like to send a photo to John over Facebook, she should be able to select 'John', open a context menu and select 'send over D2D'. The problem then arises that if the applications should do so, the identifier of a device that is used in the application (i.e., the first identifier) should be linkable to device identifiers used for routing in the telecommunications network of the mobile network operator of the second device (i.e. the second and third identifiers). This problem is solved by implementing a routing entity ("first routing entity") on the side of one cellular device initiating a D2D communication ("first device") with another cellular device ("second device") and a routing entity ("second routing entity") on the side of the second device. The first routing entity is capable of resolving the first identifier of the second device into a second identifier of the second device, provided the second device has in the past registered the association between its network-level identity and its application-level identity with an OTT service provider or another database, and on the basis of that identifying the second routing entity and then contacting the second routing entity with a connection request containing the first and/or second identifier of the second device. The second routing entity is capable of resolving the received first identifier or/and second identifier of the second device to a third identifier of that device. The two routing entities are further configured to cooperate in exchanging contact information for the first and second devices and configuring their respective edge firewalls (i.e., firewalls between a core network and a further network such as e.g. Internet for each respective MNO) for a data exchange between the devices. In this manner, an infrastructure-based D2D connection may be established between a pair of devices, each behind a respective network-level firewall (i.e. a firewall controlled by their respective telecommunications network and/or MNO).

In one embodiment, the method performed by the first routing entity may further include steps of receiving from the first device a command to terminate the connection between the first device and the second device, instructing the firewall of the first device to terminate the connection, and optionally, providing an indication to the second routing entity that the connection will be terminated. Correspondingly, the method performed by the second routing entity may then further include steps of receiving from the first routing entity an indication that the first device issued a command to terminate the connection between the first device and the second device, and instructing the firewall of the second device to terminate the connection and/or providing an indication to the second device that the connection is to be terminated. In this manner, the first device may initiate termination of the connection.

In another embodiment, the method performed by the first routing entity may further include steps of receiving from the second routing entity an indication that the second device issued a command to terminate the connection between the first device and the second device, and instructing the firewall of the first device to terminate the connection and/or providing an indication to the first device that the connection is to be terminated. Correspondingly, the method performed by the second routing entity may then further include steps of receiving from the second device a command to terminate the connection between the first device and the second device, instructing the firewall of the second device to terminate the connection, and, optionally, providing an indication to the first routing entity that the connection will be terminated. Such an embodiment allows the second device to initiate termination of the connection.

In one embodiment, the first routing entity resolving the first identifier of the second device to determine the second identifier of the second device could comprise the first routing entity sending a request including the first identifier to a server associated with an OTT application and receiving a response including the second identifier. In another embodiment, the first routing entity resolving the first identifier of the second device to determine the second identifier of the second device could comprise the first routing entity accessing logic for constructing second identifiers based on first identifiers and applying the logic to the received first identifier of the second device to construct the second identifier of the second device. In yet another embodiment, the first routing entity resolving the first identifier of the second device to determine the second identifier of the second device could comprise the first routing entity decrypting the received first identifier using the public key of the server associated with the OTT application. In an embodiment, the second identifier of the second device may be the same as the first identifier of the second device.

In one embodiment, the second routing entity resolving the second identifier of the second device to determine the third identifier of the second device could comprise the second routing entity accessing a database that comprises (identifies) a plurality of second identifiers and a plurality of third identifiers, each of the plurality of third identifiers corresponding to one or more of the plurality of second identifiers, and identifying one of the plurality of the third identifiers stored in the database that corresponds to the received second identifier of the second device as the third identifier of the second device. In another embodiment, the second routing entity resolving the second identifier of the second device to determine the third identifier of the second device could comprise the second routing entity accessing logic for constructing third identifiers based on second identifiers and applying the logic to the received second identifier of the second device to construct the third identifier of the second device. In an embodiment, the third identifier could be the same as the second identifier. In an embodiment, the second identifier may be decrypted with a secret known to the second routing entity to obtain the third identifier.

In an embodiment, the contact information of the first device may comprise an IP address and one or more port numbers of the first device to be used for communicating data over the connection and the contact information of the second device may comprise an IP address and one or more ports of the second device to be used for communicating data over the connection.

In a preferred embodiment, the first routing entity may comprise a direct mode control center (DMCC) within a core network of the telecommunications network of the first mobile network operator while the second routing entity may comprise an analogous DMCC within a core network of the telecommunications network of the second mobile network operator.

In yet another aspect of the present invention, a computer-implemented method to be performed by the first device as described above is disclosed. The method includes steps, performed by the first device, of obtaining, from an OTT service provider connected to a network external to the telecommunications network of the first mobile network operator and external to the telecommunications network of the second mobile network operator, a first identifier for the second device, providing to the first routing entity as described above a connection request comprising the first identifier for the second device, and, optionally, receiving from the first routing entity contact information of the second device. In an embodiment, such a method may further include either a step of the first device providing to the first routing entity a command to terminate the connection between the first device and the second device or a step of the first device receiving from the first routing entity an indication that the connection is to be terminated.

In still another aspect of the present invention, a computer-implemented method to be performed by the second device as described above is disclosed. The method includes steps, performed by the second device, of providing to an OTT service provider connected to a network external to the telecommunications network of the first mobile network operator and external to the telecommunications network of the second mobile network operator a first identifier for the second device, receiving from the second routing entity as described above a connection request for the connection between the first device and the second device, optionally, providing to the second routing entity an indication that the second device accepts the connection request, and, optionally, receiving from the second routing entity contact information of the first device. In an embodiment, such a method may further include either a step of the second device providing to the second routing entity a command to terminate the connection between the first device and the second device or a step of the second device receiving from the second routing entity an indication that the connection is to be terminated.

According to other aspects of the present invention, data processing systems and apparatuses for carrying out method steps as described herein are provided. Each of the data processing system and the apparatus comprise at least a processor configured to carry out method steps described herein. Such a data processing system could be included within the apparatus.

The disclosure may also relate to a computer program, implemented on computer-readable storage medium, and to a computer-readable storage medium, preferably non-transitory, storing such a computer program. The computer program may comprise software code portions configured for, when run on a computer, executing the method steps according to any of the methods described in the present disclosure.

In the previous embodiments, the second device may alternatively be connected to a second network other than a telecommunications network of a second network operator (MNO A). For example, the second network may be a fixed or wireless network, e.g. of a second operator or the first operator, The wireless network may be a WiFi network, e.g. comprise wireless access points or hotspots. The second device may be connected to the second network via a private network, such as a home network or a company network, which may be fixed and/or wireless, e.g. a WiFi network. As described in the previous embodiments there may be a second firewall between the second device and the second network to which the second device is connected. The second firewall may for example be a home gateway configurable as a firewall. The second firewall may be under operator control from the second network, i.e. the operator can change firewall settings from the second network, and/or the second firewall may be controlled from the private network, e.g. the second device may change firewall settings. However, if there is a second firewall, changing firewall settings between the second device and the second network may be complex, subject to diverse firewall control policies, and may be a security risk. It is therefore proposed in the following aspects and embodiments to let connections be setup from the second device through the second firewall also if the connection request is initiated from the first device, because outgoing traffic through a firewall is usually allowable. Advantageously, D2D connections between different networks or different network segments can be set up, also if one of the networks is not a mobile network.

In the following aspects and embodiments, the second device may register its first identifier (application level identifier) and its second identifier (operator level identifier) with a second routing entity that comprises a registration database. The second network may comprise the second routing entity, e.g. a DMCC. The second routing entity may not be configured to configure the second firewall, but this is not precluded. The first identifier and the second identifier may be stored in the registration database. The relation between the first identifier and the second identifier can be stored in any way deemed useful by the skilled person. The second routing entity may forward the first identifier and the second identifier to the OTT service. This allows the first routing entity to resolve the first identifier of the second device into the second identifier of the second device and thus identify the second routing entity. Ways to resolve the first identifier of a device into a second identifier have been described above, and are not repeated here.

Alternatively the second routing entity may be under control of the OTT service provider. An advantage may be that operators and users can share the same second routing entity for devices that register their first identifiers and second identifiers with the second routing entity, at least for the same OTT service.

A connection may be kept open between the second device and the second routing entity, so that the second device can always be reached from the second routing entity, for example to deliver a connection request. Also notification services such as provided by OTT providers may be used to deliver a connection request to the second device, e.g. via the second network or via a different network with which the second device may also be connected, for example a mobile network. Notification services delivering push notifications enable the sending of messages to a device without requiring an IP-level connection to the phone, thus reducing battery drainage.

The second device may register with the second routing entity before or during setup of a connection by the second device, e.g. be configured during the setup by the second device when necessary. The second device may have obtained a second identifier using a (U)SIM, soft SIM, SIM AKA procedure or similar method prior to registration with the second routing entity and the registration of the second identifier with the OTT service. For example, the mobile device is associated with a subscription with a mobile network operator, or it has obtained credentials from another device (see for example application 13190078.9).

In another aspect of the invention, a computer-implemented method for a first routing entity controlled by a first mobile network operator is disclosed. This method enables establishment of a connection between a first device connected to a telecommunications network of the first mobile network operator and a second device connected to a second telecommunications network, The method includes steps to be performed by the first routing entity of: receiving from the first device a connection request comprising a first identifier for the second device; resolving the first identifier of the second device into a second identifier of the second device identifying a second routing entity; providing to the second routing entity a connection request for the connection between the first device and the second device, the connection request comprising the first identifier or/and the second identifier of the second device; providing to the second routing entity contact information of the first device; receiving from the second routing entity contact information of the second device; and configuring a first firewall for a data exchange over the connection between the first device and the second device in accordance with the contact information of the first device and the contact information of the second device, wherein the first firewall is a firewall of the telecommunications network to which the first device is connected that is configured to protect the first device.

In yet another aspect of the invention, a computer-implemented method for a second routing entity is disclosed. This method enables establishment of a connection between a first device connected to a telecommunications network of a first mobile network operator and a second device connected to a second telecommunications network. The method includes steps to be performed by the second routing entity of: receiving from a first routing entity controlled by the first mobile network operator a connection request for the connection between the first device and the second device, the connection request comprising a first identifier or/and a second identifier of the second device; resolving the first identifier or/and the second identifier of the second device to determine a third identifier of the second device; providing the connection request, or a derivative thereof, to the second device identified by the third identifier; receiving, from the first routing entity, contact information of the first device; optionally, receiving from the second device an indication that the second device accepts the connection request; and providing contact information of the second device to the first routing entity.

In another aspect of the invention, a computer-implemented method for a first device connected to a telecommunications network of a first mobile network operator is disclosed. This method enables establishment of a connection between the first device and a second device connected to a second telecommunications network. The method comprises: obtaining from an over-the-top (OTT) service provider connected to a network external to the telecommunications network of the first mobile network operator and external to the second telecommunications network a first identifier for the second device; providing to a first routing entity controlled by the first mobile network operator a connection request comprising the first identifier for the second device; and optionally, receiving from the first routing entity contact information of the second device.

In yet another aspect of the invention, a computer-implemented method for a second device connected to a second telecommunications network is disclosed. This method enables establishment of a connection between a first device connected to a telecommunications network of a first mobile network operator and the second device. The method comprises: providing to an over-the-top (OTT) service provider connected to a network external to the telecommunications network of the first mobile network operator and external to the second telecommunications network a first identifier for the second device; registering with a second routing entity the first identifier and a second identifier of the second device; receiving from the second routing entity a connection request for the connection between the first device and the second device; optionally, providing to the second routing entity an indication that the second device accepts the connection request; and optionally, receiving from the second routing entity contact information of the first device.

In a further aspect of the invention, a computer-implemented method for a second routing entity is disclosed. This method enables establishment of a connection between a first device connected to a telecommunications network of a first mobile network operator and a second device connected to a second telecommunications network, the method comprising: receiving from the second device a connection request comprising a first identifier for the first device; resolving the first identifier of the first device into a second identifier of the first device identifying a first routing entity; providing to the first routing entity a connection request for the connection between the first device and the second device, the connection request comprising the first identifier or/and the second identifier of the first device; providing to the first routing entity contact information of the second device; receiving from the first routing entity contact information of the first device; and providing to the second device contact information of the first device.

In yet a further aspect of the invention, a computer-implemented method for a first routing entity controlled by a first mobile network operator is disclosed. This method enables establishment of a connection between a first device connected to a telecommunications network of the first mobile network operator and a second device connected to a second telecommunications network. The method comprises: receiving from a second routing entity a connection request for the connection between the first device and the second device, the connection request comprising a first identifier or/and a second identifier of the first device; resolving the first identifier or/and the second identifier of the first device to determine a third identifier of the first device; providing the connection request, or a derivative thereof, to the first device identified by the third identifier; receiving, from the second routing entity, contact information of the second device; optionally, receiving from the first device an indication that the first device accepts the connection request; providing contact information of the first device to the second routing entity; and configuring a first firewall for a data exchange over the connection between the first device and the second device in accordance with the contact information of the first device and the contact information of the second device, wherein the first firewall is a firewall of the telecommunications network to which the first device is connected that is configured to protect the first device.

When the first routing entity (e.g. a DMCC) receives from the first device a connection request comprising a first identifier of the second device, the first routing entity resolves the first identifier of the second device into a second identifier of the second device, for example by sending the request comprising the first identifier to the OTT service and then receiving the second identifier. The first routing entity determines the second routing entity based on the second identifier and sends the connection request comprising the first and/or second identifier of the second device to the second routing entity. If the connection is kept open between the second device and the second routing entity, the connection may be used to send the connection request to the second device. Alternatively, push services may be used to send the connection request to the second device. Preferably, the connection request comprises contact information of the first device (e.g. a public IP address and optionally a port number). The connection information of the first device may also be delivered to the second device separately. The first routing entity may obtain contact information of the first device from the first device or from a first firewall, wherein the first firewall is a firewall in the telecommunications network to which the first device is connected and that is configured to protect the first device. The second device receives the connection request and may deny or accept the request. The second device may receive contact information of the first device comprised in the connection request or may receive the contact information of the first device separately. The second device may send a response to the first routing entity including contact information of the second device for the connection between the first device and the second device (e.g. a public IP address and optionally a port number). The first routing entity configures a first firewall for a data exchange over the connection between the first device and the second device in accordance with the contact information of the first device and the contact information of the second device, wherein the first firewall is a firewall in the telecommunications network to which the first device is connected and that is configured to protect the first device. The second device can now setup the connection between the first device and the second device based on the connection information of the first device. Termination of the connection between the first device and the second device by instructing a firewall to terminate the connection can be performed as in previous described embodiments and is not repeated here. The connection may also be terminated after a pre-defined time.

Optionally, an authentication token can be included in the connection request to the second device, which the second device can use in its response to authenticate itself as the second device to the first device and/or to network elements of the first network such as the first firewall. The authentication token may be generated by the first routing entity, the first firewall or any other element of the first network and may be shared between the elements of the first network.

When the second device would like to setup a connection to the first device, it contacts the second routing entity. If not registered, the second device may first have to register as described above. The second routing entity receives from the second device a connection request comprising a first identifier for the first device. The second routing entity resolves the first identifier of the first device into a second identifier of the first device identifying the first routing entity. Thus, advantageously, the second device can setup a connection to devices related to different routing entities, e.g. related to different operators. The second routing entity may forward the connection request to the first routing entity. The connection request for the connection between the second device and the first device is then received by the first routing entity. The first routing entity resolves the first or/and the second identifier of the second device to determine a third identifier of the first device. The first routing entity provides the connection request, or a derivative thereof, to the first device identified by the third identifier. The first device receives the connection request from the first routing entity and may deny or accept the request. The first device may send a response to the first routing entity which may include an IP address and optionally a port number. The first routing entity may request a first firewall contact information of the first device (e.g. a public IP address and optionally a port number, which may be different than the information from the first device, e.g. because the firewall performs NAT translation). The first routing entity sends a response to the second device comprising the contact information of the first device, e.g. via the second routing entity. The first routing entity configures the first firewall for a data exchange over the connection between the first device and the second device in accordance with the contact information of the first device and the contact information of the second device, wherein the first firewall of the telecommunications network to which the first device is connected that is configured to protect the first device. The second device can now setup the connection with the first device based on the contact information of the first device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the users computer, partly on the users computer, as a stand-alone software package, partly on the users computer and partly on a remote computer, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The disclosure will further be illustrated with reference to the attached drawings, which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
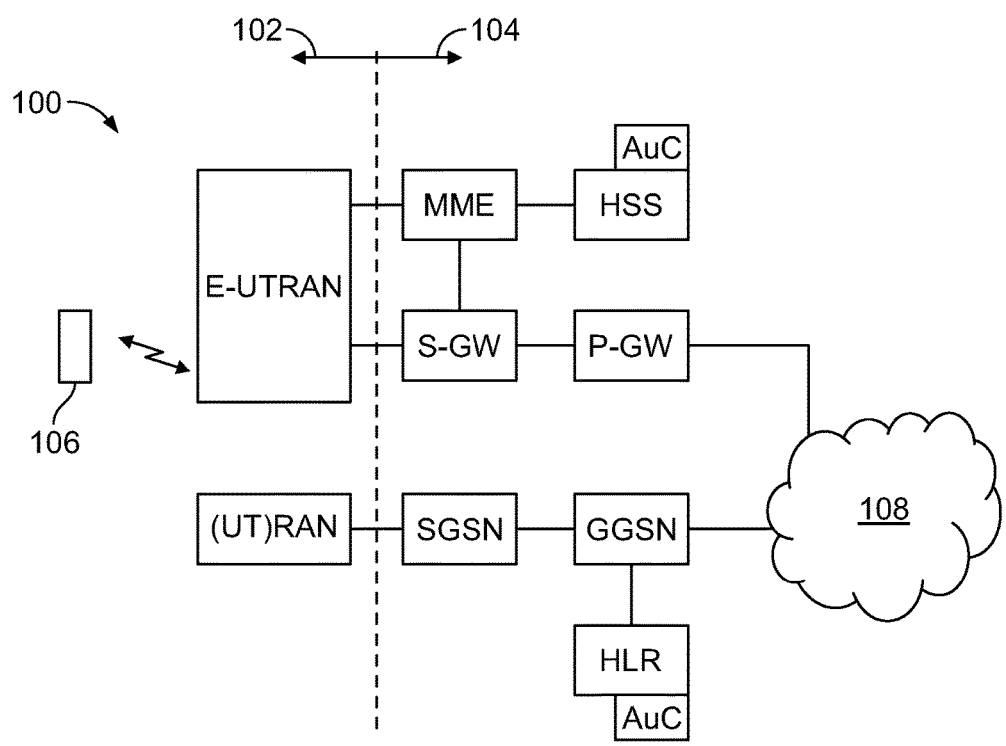
FIG. 1 shows a schematic illustration of a telecommunications system, according to one embodiment of the present invention.

FIG. 1 shows a schematic illustration of a telecommunications system 100. The telecommunications system 100 comprises a radio access network 102 (also indicated as E-UTRAN or (UT)RAN in FIG. 1) and a core network 104 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network.

For a GSM/GPRS telecommunications network (i.e., a 2G/2.5G telecommunications network), a radio access network 102 comprises a plurality of base stations (BTSs) and one or more Base Station Controllers (BSCs), not shown individually in FIG. 1. The core network 104 comprises a Gateway GPRS Support Node (GGSN), a Serving GPRS Support Node (SGSN, for GPRS) or Mobile Switching Centre (MSC, for GSM, not shown in FIG. 1), and a Home Location Register (HLR) combined with an Authentication Centre (AuC). The HLR contains subscription information for mobile devices 106 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 102 comprises a Radio Network Controller (RNC) connected to a plurality of NodeBs, also not shown. In the core network 104, the GGSN and the SGSN/MSC are conventionally connected to the HLR/AuC that contains subscription information and shared secret keys K of the mobile devices 106.

The upper branch in FIG. 1 represents a next generation telecommunications network, commonly indicated as Long Term Evolution (LTE) system or Evolved Packet System (EPS) (i.e., a 4G telecommunications network). In such a network, the radio access network 102, indicated as E-UTRAN, comprises evolved NodeBs (eNodeBs or eNBs) providing wireless access for the mobile devices 106. The core network 104 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of an EPS network can be found in 3GPP TS 23.401.

For GPRS, UMTS and LTE telecommunications network, the core network 104 is generally connected, using e.g. a gateway (e.g the P-GW), to a further network 108 which could be any external packet switched network such as e.g. Internet or a dedicated network to provide connectivity between different operators.

Of course, architectures other than defined by 3GGP, e.g. WiMAX and/or CDMA2000, can also be used within the context of the present disclosure and this does not preclude future architectures such as 5G.

Figure 2:
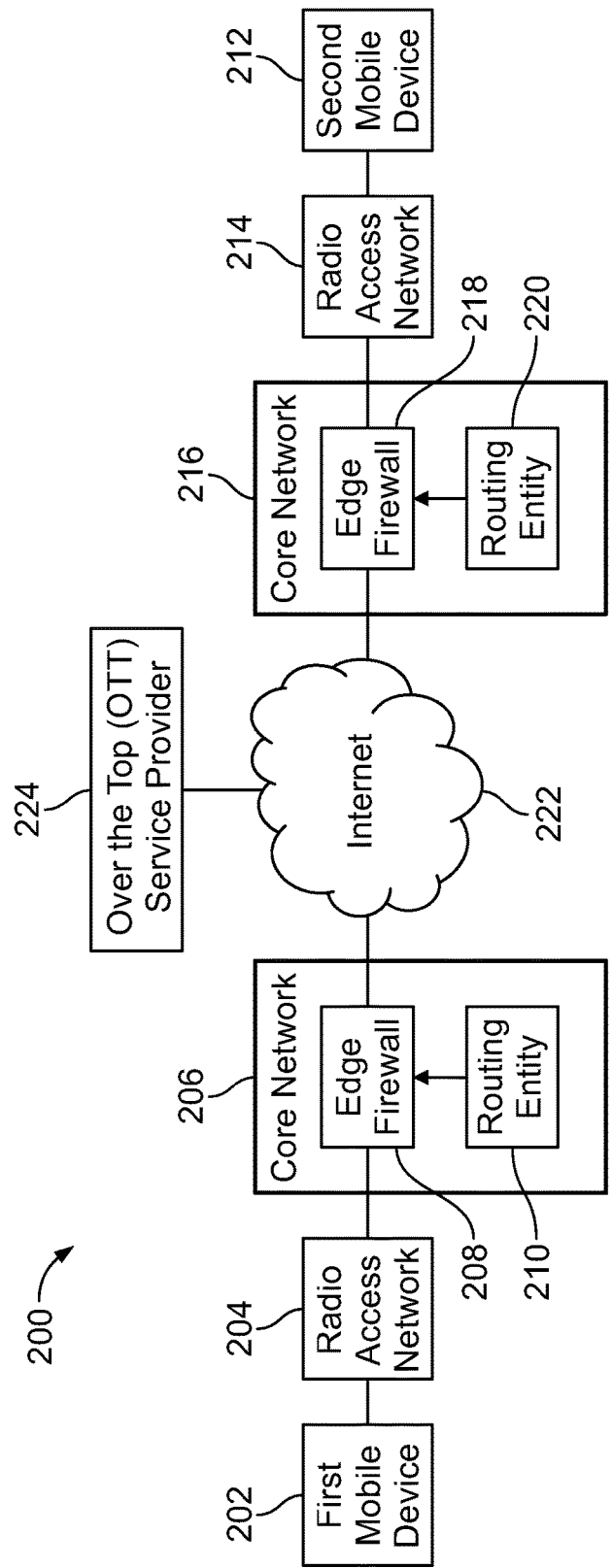
FIG. 2 provides a schematic illustration of a system that enables establishment of an infrastructure-based D2D connection between two devices, according to one embodiment of the present invention.

FIG. 2 provides a schematic illustration of a system 200 that enables establishment of an infrastructure-based D2D connection between two devices running the same, or compatible, OTT application, according to one embodiment of the present invention. For illustrative purposes, in the description of FIGS. 2-6, consider that the OTT application running on both devices is Facebook. Further consider that the end-user of the first device, Mary, is friends on Facebook with the end-user of the second device, John, and that Mary would like to send a picture to John using infrastructure-based D2D communication. As described herein, the system 200 allows Mary to select John on her device (e.g., a smart phone) and select to send a picture. The system 200 allows John to accept the request, as a result of which a connection may be set up between the devices of Mary and John. The picture may be sent over this connection and the connection may be released again.

Other example applications of infrastructure based D2D communications may include: two end-users playing a user-to-user game on their respective devices, sending business cards from one end-user to another end-user, remote control of a device (e.g. an appliance) from another device (e.g. smart phone), a device (e.g. a sensor) sending an alarm to another device, or a device (e.g. a tablet-PC) sending a print job to another device (e.g. a printer).

As shown in FIG. 2, the system 200 includes a first mobile device 202 (Mary's device in the scenario described above) connected to a telecommunications network, referred to hereafter as a "first telecommunications network", of a first mobile network operator A, which is shown in FIG. 2 with the device 202 being connected to a radio access network 204 of the first telecommunications network. The radio access network 204 is, in turn, connected to a core network 206 of the first telecommunications network. Similarly, the system 200 includes a second mobile device 212 (John's device in the scenario described above) connected to a telecommunications network, referred to hereafter as a "second telecommunications network", of a second mobile network operator B, which is shown in FIG. 2 with the device 212 being connected to a radio access network 214 of the second telecommunications network. The radio access network 214 is, in turn, connected to a core network 216 of the second telecommunications network.

Each of the radio access networks 204 and 214 could be one of the radio access networks 102 illustrated in FIG. 1, while each of the core networks 206 and 216 could be one of the core networks 104 illustrated in FIG. 1. Each of the mobile devices 202 and 212 could be the mobile device 106 illustrated in FIG. 1, connected to its' respective network 100. Further, similar to the architecture illustrated in FIG. 1, the core networks 206 and 216 are connected to a further network 222, which, like the further network 108 shown in FIG. 1 could be any external packet switched network such as e.g. Internet or a dedicated network to provide connectivity between different MNOs. A server of an OTT service provider 224, such as e.g. Facebook, is connected to the Internet 222.

As further shown in FIG. 2, the core network 206 under the control of the MNO A includes an edge firewall 208. Similarly, the core network 216 under the control of the MNO B includes an edge firewall 218.

The edge firewalls 208 and 218 are components that aim to ensure that the network and the devices behind those firewalls are protected against cyber attacks, such as port scans, login attempts, etc., where the "network" can include any of the networks of the operator, ranging from operational cellular networks including devices of its subscribers to office networks and other networks without subscribers. The firewalls 208 and 218 therefore also protect the subscribers from unsolicited data. Effectively the firewalls 208 and 218 block any communication to the respective subscriber's device (the first and second devices, respectively) if the device did not initiate these communications itself. In other words, the firewalls prevent incoming connections to the devices. Therefore, these are the firewalls that need to be reconfigured if a device protected by or, as said in the art, is 'behind' such a firewall would like to receive connections from another device not behind the same firewall. In some cases, this may even apply for two devices that are behind the same firewall. For example, routing protocols may still enforce that any traffic between two devices behind the same firewall has to pass through that firewall, giving the firewall the possibility to disallow such traffic. In such cases, the protecting firewall would need to be reconfigured to allow these two devices to directly connect to one another.

In mobile telecommunications networks, firewall functionality is sometimes performed inside the P-GW of a network. Therefore, according to embodiments of the present application, what is referred to as a "firewall" is to be understood to, possibly, also comprise a P-GW or be a combination of a firewall and a P-GW.

Furthermore, in some networks, a networking device may be employed that translates between public IP addresses and IP address internal to the network, called private IP addresses. Such a translation is known in the art as Network Address Translation or "NAT" and can be performed by a firewall. In common networking technology a device that is both address translation and working as a firewall is called a NAT'ing firewall. One or both of the firewalls 208 and 218 could comprise such NAT'ing firewalls.

As also shown in FIG. 2, the core network 206 under the control of the MNO A further includes a first routing entity 210. Similarly, the core network 216 under the control of the MNO B further includes a second routing entity 220.

Each of the first and second routing entities 210 and 220 could be implemented on a DMCC. A DMCC as described herein is a device implementing a ProSe Function and comprising a ProSe Application Server. As known in the art, a ProSe Function is a control function for enabling direct communication between UEs. As described in TS 23.303 of 3GPP, such a ProSe Function may provide the UEs with the necessary parameters in order to use ProSe Direct Discovery and ProSe Direct Communication, where the word "Direct" refers to a direct radio link between the discovered or communicating ProSe-enabled UEs. The ProSe Function may be configured to keep track of the mapping of ProSe Application IDs and ProSe Application Codes used in the ProSe Direct Discovery, where the "Application IDs" refer to a globally unique identifier identifying application-related information for the ProSe-enabled UE and the "Codes" refer to the codes that are associated with the ProSe Application IDs and are used for the discovery process. In the context of the present application, "Applications" refer to applications installed on the mobile operating system, such as LinkedIn, Facebook, etc. The ProSe Function may further be configured to provide the UEs with the necessary radio or network parameters and security material for discovery and communication, handle and maintain a registry of the user application identifiers and subscribers, maintain a registry of applications that are authorized to use ProSe discovery services, etc. Furthermore, the ProSe Function may include methods and functions for detecting proximity of two UEs and/or communicating proximity of two UEs with other operators' ProSe Functions.

The ProSe Application Server may keep a registry of EPC ProSe User IDs and ProSe Function IDs and be configured to map the Application Layer User ID and EPC ProSe User ID. The EPC ProSe User ID may, for example, be an identifier that the UE can broadcast or listen for on a radio channel such as wireless local area network (WLAN). The ProSe Function ID refers to a ProSe Function in the operator's network.

Still further, the ProSe Function may be configured to inform UEs when a particular direct mode device is nearby another direct mode device and a request for direct communication by any of these devices is received. Upon such a request, the ProSe Function may cooperate with the ProSe Application Server and the application to provide the UE with a list of friends who are nearby. As used herein, the term 'friends' refers to any list of friends that e.g. the subscriber has provided to the ProSe Function to query the application service for.

Herein, the application server or services (e.g. an application) are referred to as "over the top services" or "OTT services".

According to embodiments of the present invention, the DMCCs 210 and 220 are further extended to control the edge firewalls 208 and 218, respectively. By adding a signalling channel between the mobile devices and the respective DMCC, better control over the holes in the firewall may be achieved, leading to added security compared to uncontrolled firewall hole punching techniques.

In case the first and second devices 202, 212 are connected to the same telecommunications network of a single MNO, the DMCCs 210 and 220 may be implemented as a single DMCC. Of course, in various embodiments functionality of the DMCCs 210 and 220 may be combined or distributed over any number of logical devices.

Figure 3:
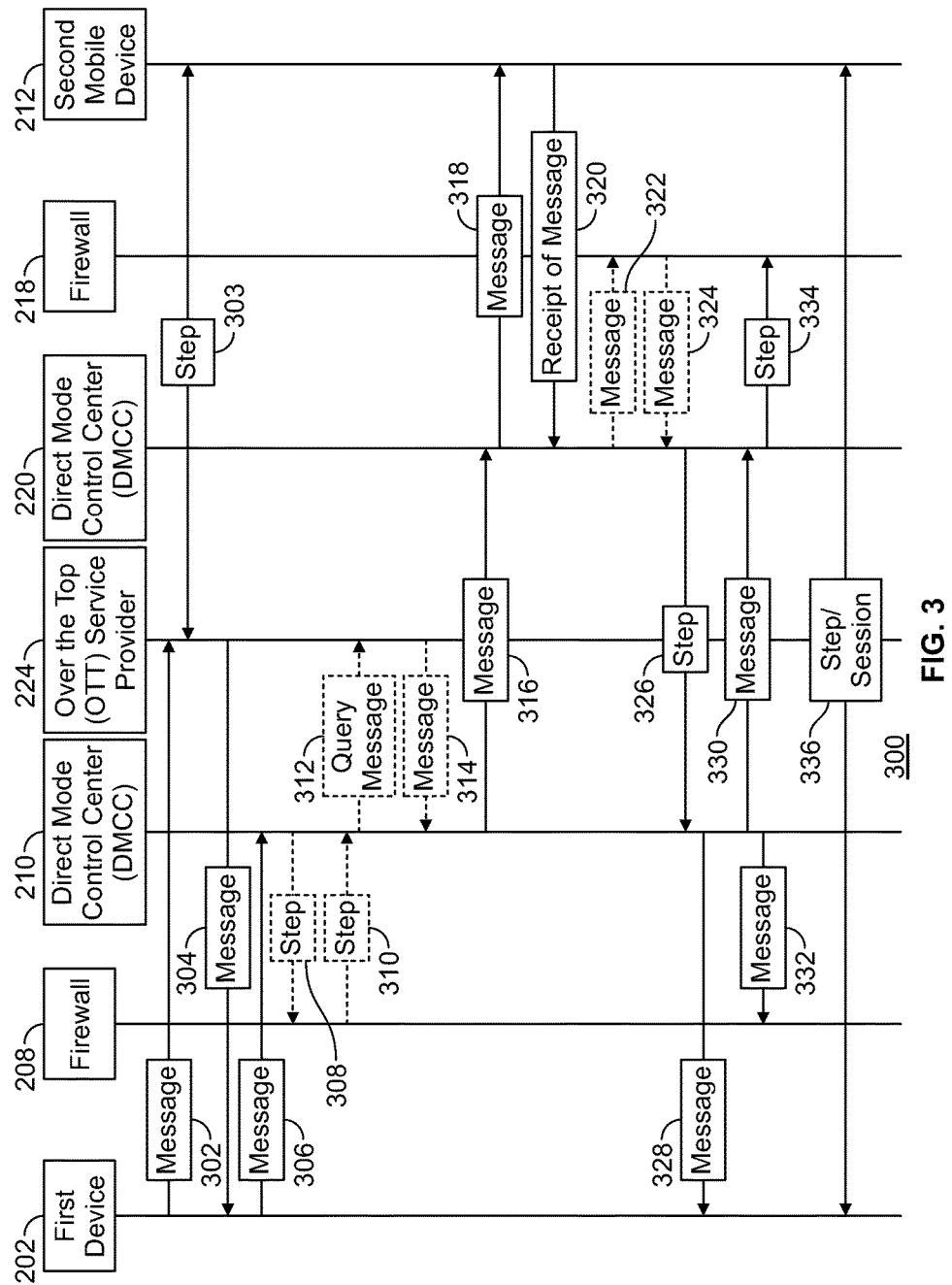
FIG. 3 illustrates a messaging diagram for setting up an infrastructure-based D2D connection between the first and second devices illustrated in FIG. 2, according to one embodiment of the present invention.

FIG. 3 illustrates a messaging diagram for a method 300 of setting up an infrastructure-based D2D connection between the first device 202 and the second device 212, according to one embodiment of the present invention.

The first device 202 may comprise a user interface that allows the user (i.e., Mary) to indicate that the user of the first device 202 would like to send data, e.g. a picture, to a user of another mobile device, e.g. to the second device 212 of John, using infrastructure-based D2D communication between the first and second devices 202, 212. Mary and John are known to the first and second devices 202, 212 to be connected on an OTT application, e.g. to be "friends" on Facebook.

In response to receiving user input indicative of Mary's desire to send data to John in this manner, the first device 202 may request the OTT service provider 224, in step 302 shown in FIG. 3, for a first identifier of the second device 212. If the OTT service provider 224 is not in the possession of the first identifier for the second device 212, the OTT service provider 224 will request such an identifier from the second device 212 in a procedure shown with step 303, described in greater detail below. Step 303 may be omitted if the OTT service provider 224 is aware of the first identifier of the second device 212, e.g. because the second device 212 already provided its first identifier to the OTT service provider 224, e.g. using an earlier procedure 303.

In step 304, the OTT service provider 224 replies to the first device 202 with the first identifier of the second device 212. Such an identifier could be a phone number or another identifier as long as the first routing entity 210 is able to resolve the identifier to the MNO B. For example, device2@mno-b.countrycode could be an example of such an identifier. Optionally, a first identifier could also include more information, such as the application that it is for—e.g. facebook.device2@mno-b.countrycode, or the specific peer—e.g. device-a.facebook.device2@mno-b.countrycode. Further examples of the first identifiers are provided below.

Optionally, the first device 202 may be configured to store the first identifier obtained from the OTT service provider 224 for any period of time, to be used later without the need to perform step 304 again.

The first device 202 then forwards the first identifier of the second device to the DMCC 210 in message 306. In that message, optionally, the first device 202 may also include separate information indicating the application used (e.g. an application identifier). Furthermore, the first device 202 may also include the IP address and port number that the first device intends to use for the communication. If that is the case, then the DMCC 210 may check whether the received IP address is a public IP address. If not, the DMCC 210 may obtain a public IP address and port number that can be used for the communication session of the first device 202, e.g. by querying the firewall 208 and/or another firewall of the first telecommunications network, as shown with a step 308. The IP address and port number that are returned to the DMCC 210 in step 310 may form at least a part of the contact information of the first device 202 to be used for the infrastructure-based D2D communication.

In alternative embodiments, the first device 202 may provide the IP address and port number that the first device intends to use in a message separate from the message 306 and/or at any point in time that is earlier or later than the message 306.

In another alternative embodiment, the first device 202 may let the DMCC 210 handle the communication with the OTT service 224. In such an embodiment, the order and the endpoints of the messages 302, 304 and 306 may change as follows. The first device will first sends a single message that contains the information from the messages 302 and 306, except for the first identifier, to the DMCC 210. The DMCC 210 will then send the message 302 to the OTT service and the OTT service will reply with the message 304 to the DMCC 210. In this manner, effectively, the DMCC 210 can handle the communication with the OTT service on behalf of the first device 202.

In response to receiving the first identifier of the second device from the first device 202, the DMCC 210 may check whether it can resolve the first identifier to a second identifier to identify a specific MNO (i.e., to the MNO of the second device 212) so that the MNO/DMCC of the second device can be contacted). Thus, the second identifier allows identification of the second device and at least a part of the second identifier (e.g., a domain name, mobile network code, or country code) can be used to contact the DMCC 220 of the second device by means of knowing to which MNO the second device belongs to. The exact procedures to contact a specific DMCC 220 depend on the type information used in the at least part of the second identifier and are known to the persons skilled in the art. For that purpose, in various embodiments, the DMCC 210 could interact with the OTT service provider 224 to resolve the first identifier into a second identifier, interact with public databases, such as a domain name server (DNS), or interact with databases accessible by at least MNOs A and B (e.g. an infrastructure DNS, or the HLR of the MNO B).

For example, in one embodiment, the DMCC 210 can resolve the first identifier because the first identifier contains all the relevant bits for the second identifier. In this case, the DMCC 210 can construct the second identifier using some logic known to the DMCC 210, by removing or adding parts or by querying databases that MNOs A and B share between each other, such as e.g. an HLR Lookup query.

In another embodiment, in case that the first identifier does not contain all of the relevant bits for the second identifier, the DMCC 210 may be configured to query the OTT service provider 224 for the second identifier, as shown in FIG. 3 with a query message 312. A response of the OTT service provider with the second identifier, or information that then allows the DMCC 210 to determine the second identifier, is shown in FIG. 3 with a message 314. The varying advantages of this approach are discussed below when different types of identifiers are discussed in greater detail.

Once the DMCC 210 has successfully resolved the first identifier to the second identifier, then, having identified the MNO B, the DMCC 210 can identify the DMCC 220 of the second device and, in step 316, the DMCC 210 can send a message 316 to the DMCC 220 of MNO B with a connection request for the second device 212, using the resolved second identifier. The connection request may comprise the first and/or second identifier, and optionally may include contact information for the first device and/or an indication of the application used (e.g. an application identifier).

The DMCC 220 may then check for validity of the second identifier of the second device 212, check whether the second device 212 is within reach and if so, whether it is roaming. The DMCC 220 may then resolve the first and/or second identifier received in the connection request to a third identifier, e.g. by using its own database of identifiers. The DMCC 220 may then send a message 318 to the second device 212 with the connection request from the first device. Depending on the configuration, the second device 212 may comprise a user interface for displaying the received connection request to the user, possibly inside the specific OTT application if an indication of the application used is provided either as part of the first identifier or added as a separate information element in message 318 or another message, and for receiving user input as to whether or not to accept the request. The second device 320 may then reply to the DMCC 220 with a message 320 indicating to the DMCC 220 that the connection request has been accepted or rejected. Either in that or in a separate message the second device 212 could also include the IP address and port number that the second device intends to use for the infrastructure-based D2D communication with the first device 202.

Assuming that the second device has accepted the connection request, upon the receipt of message 320 indicating the acceptance, the DMCC 220 may check whether the received contact information of the second device 212 is a public IP address. If not, the DMCC 220 may obtain a public IP address and port number for the communication e.g. by querying the firewall 218. To that end, as shown in FIG. 3, the DMCC 220 may send the received IP address and port number of the second device to the firewall 218 in a message 322. The firewall 218 may create a NAT rule, select a port number for the NAT, and provide its external IP address and selected port number back to the DMCC 220 in a message 324. The external IP address and the selected port number then form the "contact information" for the second device that the first device should use when setting up the TCP/IP session.

In step 326, the DMCC 220 informs the DMCC 210 that the connection is agreed. In that step or in a separate message, the DMCC 220 may include the contact information for the second device.

While in present-day networks the contact information is typically an IP address and port number that devices can use to contact one another, embodiments of the present invention are equally applicable to any other types of contact information that allows devices to contact one another. For example in IPv6 networks, one might provide a range of IP addresses or a list IP address.

The DMCC 210 forwards the connection accept message including the contact information of the second device to the first device, as shown with a message 328 and, as shown with a message 330, if it has not done so already e.g. in the message 316 described above or in a separate message, informs the DMCC 220 which contact information the first device will be using to contact the second device. The DMCC 210 also informs the firewall 208, in a message 332, that the connection between the first and second devices will be setup soon so that the firewall can configure accordingly.

In step 334, the DMCC 220 informs the firewall 218 to expect incoming traffic from the first device 202 to the second device 212 according to the specified contact information, so that the firewall 218 can be configured accordingly.

Once the firewalls 208 and 218 have been properly configured in accordance with the contact information of the first and second devices, in step 336 a TCP/IP-session connection setup from the first to the second device may take place and the first device may then send data to the second device, and vice versa, over the TCP connection that was set up. Alternatively, step 336 may comprise the first device and second device exchanging data using a stateless protocol, such as e.g. UDP, which does not need to set up a connection before exchanging data.

Figure 4:
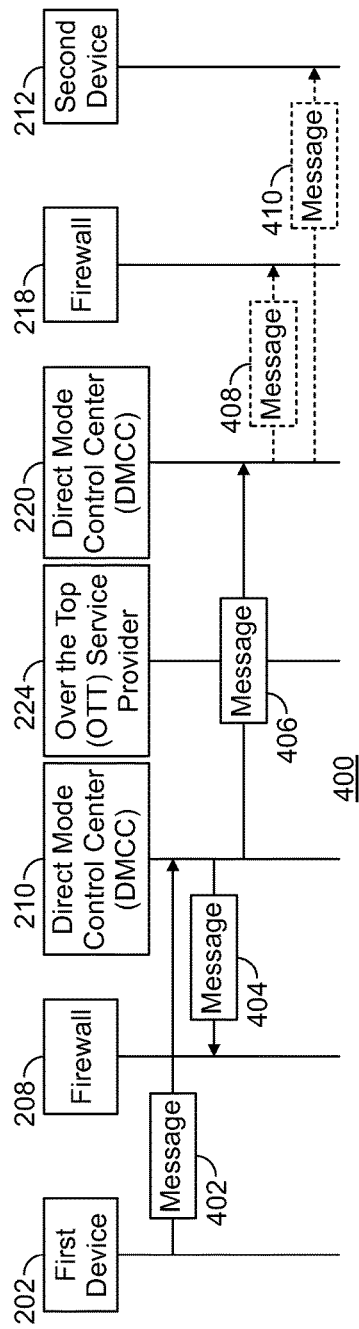
FIG. 4 illustrates a messaging diagram for a method of terminating, at the initiative of the first device, the infrastructure-based D2D connection between the first and second devices illustrated in FIG. 2, according to one embodiment of the present invention.
Figure 5:
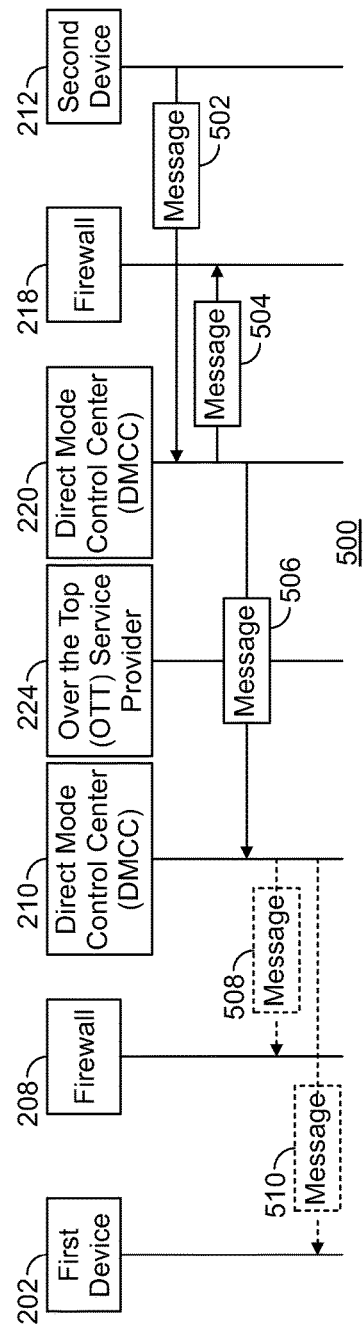
FIG. 5 illustrates a messaging diagram for a method of terminating, at the initiative of the second device, the infrastructure-based D2D connection between the first and second devices illustrated in FIG. 2, according to one embodiment of the present invention.

As illustrated in FIGS. 4 and 5, either the first or the second device may terminate the connection, e.g. in response to receiving user input to do so.

FIG. 4 illustrates a messaging diagram for a method 400 of terminating, at the initiative of the first device 202, the infrastructure-based D2D connection between the first device 202 and the second device 212, according to one embodiment of the present invention. As shown in FIG. 4 with a message 402, the first device 202 may instruct the DMCC 210 to terminate the connection. The DMCC 210 may then inform the firewall 208 that the connection can be terminated, as shown with a message 404. The DMCC 210 may also inform the DMCC 220 that the connection will be terminated soon, as shown with a message 406. It may then be up to the particular configuration of the DMCC 220 to decide what to do with this information. In an embodiment, the DMCC 220 could, which would be a good security practice, also inform its firewall 218 about the termination of the connection using a message 408, and/or inform the second device 212 using a message 410 (the second device 212 could then inform the firewall 218).

FIG. 5 illustrates a messaging diagram for a method 500 of terminating, at the initiative of the second device 212, the infrastructure-based D2D connection between the first device 202 and the second device 212, according to one embodiment of the present invention. As shown in FIG. 5 with a message 502, the second device 212 may instruct the DMCC 220 to terminate the connection. The DMCC 220 may send a message 504 to the firewall 218 to reconfigure accordingly and a message 506 to the DMCC 210 to inform of the closing of the connection. The DMCC 210 may then send a message 508 to the firewall 208 and/or a message 510 to the first device 202 (the first device 202 could then inform the firewall 208) indicating that the connection will be terminated.

In a preferred embodiment, the termination according to FIG. 4 or 5 would take place after the session 336 or the corresponding application level session is properly terminated. The sequence of steps according to FIG. 4 or 5 would then close the respective firewalls again and prevent additional costs for unsolicited data or packets to and/or from the devices.

While FIGS. 4 and 5 illustrate session termination by one of the mobile devices involved, in yet another embodiment, the first and/or the second telecommunications network could also initiate the session termination, e.g. because of a time out, a pre-paid user running out of credit, a subscriber going over the maximum number of allowed direct connections, etc. Other reasons could be news of a security breach in the application or an event triggered by an Intrusion Detection System (IDS) or the firewall 208 and/or 218. In an embodiment, when the first or second telecommunications network initiates the termination, it may send a connection termination message similar to a message 402 or 502, respectively, and commence the connection termination procedure from step 404 or 504, respectively.

Embodiments of the present invention envision various approaches to identifying the first and second devices and to resolving the identifiers by other entities. Some exemplary approaches are described below, based on which a person skilled in the art can come up with further approaches, all of which are within the scope of the present invention.

First Identifier

As previously described herein, the first identifier exists at the application level in that it is an identifier that is used between a first device and an OTT application. Therefore, in one embodiment, a first identifier may contain an identification of the OTT application. Alternatively, a separate application identifier may be sent along with the first identifier. Furthermore, depending on the implementation, a first identifier may include other identifications as described below.

In one embodiment, a first identifier may further include an identification of the MNO of the second device 212. For example, an identifier could look like "application.device2@mno-b.nl" or "application.device2.mno-b.nl" or any encrypted and/or obfuscated representation of these examples.

Such a first identifier could be split up into three parts: an application part, a second device part, and an MNO of the second device part.

An application part, which may also be sent as a separate identifier, would identify the application using its common name, such as e.g. 'Facebook', a domain name, such as e.g. facebook.com', or a numeric value referring to an entry on an agreed list of applications, such as e.g. '5' or 'App=5', and could also, optionally, include a version number, such as e.g. 'FacebookV2' or 'v2.facebook.com'. In this implementation, the application in the identifier serves the purpose of providing an indication to the second device as to which application is seeking to establish an infrastructure-based D2D connection.

A second device part is optional in the first identifier. When present, this part would comprise an identification of the second device, such as e.g. a numerical representation of a phone number, e.g. 6 1234 5678, or IMSI of the second device. Another possibility is that the second device part would comprise a custom identifier that only the DMCC 220 can resolve to an identifier that it needs to contact the second device 212, for example an encrypted representation of the phone number (possibly including a salt) or a unique number specifically crafted for the purpose. The DMCC 220 could do the resolution by using a lookup table or by using some logic and/or decryption on this part of the first identifier.

An MNO of the second device part is intended to identify the MNO to be contacted (i.e., the MNO of the second device) so that the DMCC 210 would be able to forward the connection request to a proper other DMCC. In an embodiment, the identifier of the MNO of the second device could be encrypted, e.g. using public key cryptography. In such a case, the second device 212 or the DMCC 220 could encrypt the identifier using the public key of the DMCC 210, in case the second device 212 or the DMCC 220 knows that it is the DMCC 210 from which the connection request will be received. Alternatively, it could use the private key of the DMCC 220 when the receiving DMCC is not known prior to encrypting. The latter implementation is expected to be more common. In both implementations, the identifier and/or the accompanying message will indicate what key has been used. One advantage of this embodiment is that MNO-level identifiers can be used to identify the second device, such as TMSIs or Mobile Station International Subscriber Directory Numbers (MSISDNs), without them being revealed to the OTT 224 or the first device 202.

In another embodiment, a first identifier may further include a plain identifier of the second device. In such a case, a phone number or any other identifier that is known by both MNOs could be used as an identifier. In addition, the application could be provided in the same connection request messages as a separate entity or as a part of the identifier, e.g. in the form of 'phone-number/application' or 'application@phone-number'.

In yet another embodiment, a first identifier may further include an XML message containing e.g. the second identifier, the application, a validity date, the MNO or the DMCC to be contacted, a signature of the information by the DMCC 220, an authentication ticket (also known in the art as "Kerberos ticket"), and/or other relevant parts that the DMCC 210 and/or the DMCC 220 may use to verify that the identifier is valid and that helps the DMCC 210 in resolving the correct DMCC and the correct second device. An example of such an XML message is provided below:

```
<xml>
    <identifier>
        <devicename>device2</devicename>
        <validuntil>15-12-2015</validuntil>
        <application>Facebook</application>
        <MNO>KPN</MNO>
        <signature>18fkaag8250gan31589ajdagna78wt9
        </signature>
    </identifier>
</xml>
```

In yet another embodiment, a first identifier may further include a random code generated by the OTT service provider 224 that the OTT provider can relate back to the embodiments of the identifiers described above, but now stored at the OTT. For example, the OTT service provider 224 could provide an identifier in the form of 'some-code-here@application.domain'. When the DMCC 210 would receive such a first identifier, it would be configured to contact the OTT service provider 224 to obtain a second identifier that allows the DMCC 210 to identify the MNO and/or the DMCC of the second device 212 by either an encrypted representation of the identifier described above stored at the OTT service provider 224 together with a message that instructs the DMCC 210 to query the OTT 224 for the unencrypted version or an IP address that the OTT service provider 224 has for the second device 212 because the second device is connected on that IP address to one or more servers of the OTT service provider 224.

Second Identifier

As previously described herein, the second identifier is an identifier that allows the DMCC 210 to contact the DMCC 220. In various embodiments, if the second identifier does not contain an explicit identification of the DMCC 220, then it contains at least an identification of the MNO B so that the DMCC 210 would know which MNO to contact in order to reach the DMCC 220. Thus, in various embodiments, the second identifier could provide an indication of, for example:

- a uniform resource identifier (URI) such as e.g. DMCC.mno-b.nl, which could be resolved using existing DNS lookups,
- an IP address and port number as a routable address that can be contacted directly without the need for the look up (for networks that are not IP-based, similar addresses exist for routing protocols),
- only the Mobile Network Code of the MNO B. In that case, the DMCC 210 would be configured to use some logic, e.g. according to a standard, to find out how to reach the DMCC in MNO B (provided that the DMCC in MNO B is reachable according to set standards),
- an IMSI or an MSISDN, which can be resolved to the IMSI using an HLR Lookup.

Third Identifier

In various embodiments, a third identifier could comprise an MSISDN of the second device, an internal or public IP address of the second device, an IMSI of the second device, a TMSI of the second device, or any other identifier that the second telecommunications network could use to initiate paging functionality or talk to the second device 212 directly.

Table 1 below provides a list of examples of first, second, and third identifiers as well as actions to be taken by the DMCC 210 and DMCC 220 in order to resolve the identifiers.

TABLE 1

EXAMPLES OF FIRST, SECOND, AND THIRD IDENTIFIERS

| FIRST IDENTIFIER | Resolve actions by DMCC 210 | SECOND IDENTIFIER | Resolve actions by DMCC 220 | THIRD IDENTIFIER |
|---|---|---|---|---|
| phone number/app | HLR Lookup (phone number to IMSI) | 06123456789/app | HLR Lookup -> internal network | Internal network identifier, e.g. IP address, IMSI, MSISDN, SIP, etc. |
| IMSI/app | none | IMSI/app | IMSI -> internal network id | Internal network id, e.g. IP address |
| Device2-identifier/app/mno-b | Apply logic: contact mno-b | Device2-identifier/app | Lookup: device2-identifier -> IMSI -> internal network id | Internal network ID |
| Some-secret/app | Query OTT -> some-secret to IMSI | IMSI/app | IMSI -> internal network id | Internal network id, e.g. IP address |
| Some-secret/app/MNO-B | Logic: MNO-B to IP address of DMCC of MNO-B | Some-secret/app | Decrypt some-secret -> IMSI -> internal network ID | Internal network id |
| Some-secret/app | Decrypt using public key of OTT Resolve result (could be HLR Lookup, could contain MNC, etc.) | e.g. 06123456789/app | HLR Lookup -> internal network id | Internal network id |
| <xml> ... </xml> | Parse XML -> extract MNC (or phone number of IMSI) | <xml> ... </xml> | Parse xml -> Verify validity Extract phone number/other ID Decrypt parts if necessary Lookup identifier, etc. | Internal network ID |
| Public-ip-address-of-device-2/app | Reverse DNS/Whois lookup: gives domain owner. Logic/database: translate domain owner to MNC | Public-ip-address-of-device-2/app | Query P-GW/firewall to find local network identifier OR Contact directly @ the ip address. | Internal network ID. |

Returning back to the steps illustrated in FIG. 3, in an embodiment, the step 303 could include the following. Either the OTT service provider 224 or the second device 212 could initiate the procedure. For example, the device 212 could generate one or more first identifiers as described herein according to some logic that the DMCC 220 and the second device 212 have agreed on. Alternatively or additionally, the device 212 could request the DMCC 220 to assist in the generation of one or more first identifiers. In this manner, the DMCC 220 can ensure that the identifiers are in the proper format and according to a set standard. An example of such an identifier could be a random number generated by the DMCC 220 or a temporary phone number, such as the one being used for number portability, etc. Optionally, the one of more first identifiers may be encrypted with either a private key of MNO B or a public key of MNO A (provided it is known that such encrypted identifier will be provided to the DMCC of the MNO A). Optionally, multiple first identifiers could be generated, each one for a specific MNO. The second device 212 may then provide the OTT service provider 224 with the generated one or more first identifiers.

In an embodiment, the procedure of step 303 could be done implicitly, e.g. by virtue of the second device 212 contacting the OTT service provider 224. In such an embodiment, the OTT service provider 224 would obtain the IP address of the second device and could forward this to the first device upon request, as a first identifier of the second device.

Next, embodiments of implementation of messages 332, 334, 404, 408, 504 and 508 are described.

The messages 332 and 334 instruct the firewalls 208 and 218 to open up based on an instruction from the DMCC 210 and 220, respectively. The messages 404, 408, 504 and 508 instruct the respective firewalls to close again, also based on an instruction from a respective DMCC. For illustration purposes and for simplicity sake, firewalls that operate in accordance with IPv4 are described below, but, with minor modifications apparent to a person skilled in the art, the description is also applicable to firewalls that operate in accordance with IPv6. Furthermore, the description below assumes that the firewalls work for IP based communication only and that the translation from identifier to IP address has been done before by e.g. a DMCC.

In a flat network architecture, each of the firewalls 208 and 218 could be a single firewall on the edge of the respective telecommunications network. In that case, the implementation of the messages 332 and 334 could be as follows (in a high-level firewall language):
ALLOW INGRESS TRAFFIC FROM IP.Address.Device2: Prt TO IP.Address.Device1:Prt
ALLOW EGRESS TRAFFIC FROM IP.Address.Device1: Prt TO IP.Address.Device2:Prt The IP addresses would then be added to the firewall rules of the respective firewalls. In an embodiment where a firewall is a NAT'ing firewall, the rules would be changed accordingly to reflect that the traffic is now forwarded instead of being let through, in which case care would need to be taken with respect to closing the connection again. In one embodiment, a firewall may keep this rule until it is explicitly taken down so that a corresponding DMCC should keep track of these rules as well, e.g. in some persistent storage, and explicitly remove the rules again when the connection is terminated. In another embodiment, a corresponding DMCC may be configured to indicate an expiration date for each rule.

Depending e.g. on a firewall vendor, variations may exist in how the communication between a firewall and a corresponding DMCC is implemented. In an embodiment, a DMCC may be provided with log-in credentials and sufficient permissions to allow the DMCC to add or remove rules for certain IP addresses and interfaces. In another embodiment, some of the proprietary protocols that vendors use for configuration of their firewalls could be implemented in a corresponding DMCC, e.g. a replication API could be used to push new rules to the firewall to which the rules are replicated.

In an embodiment, an entry may be inserted in the NAT table of a firewall (in case of a NAT'ing firewall) or in the table that keeps track of the open connections (in case of a stateful, i.e. not stateless, firewall). Such an embodiment could be advantageous in that the corresponding DMCC does not have to keep an administration of all connections and that the firewalling techniques which cause an entry in either table to be removed are still in place. A corresponding DMCC may then be configured to query the firewall for the entries in the table and figure out which entry is relevant.

Figure 6:
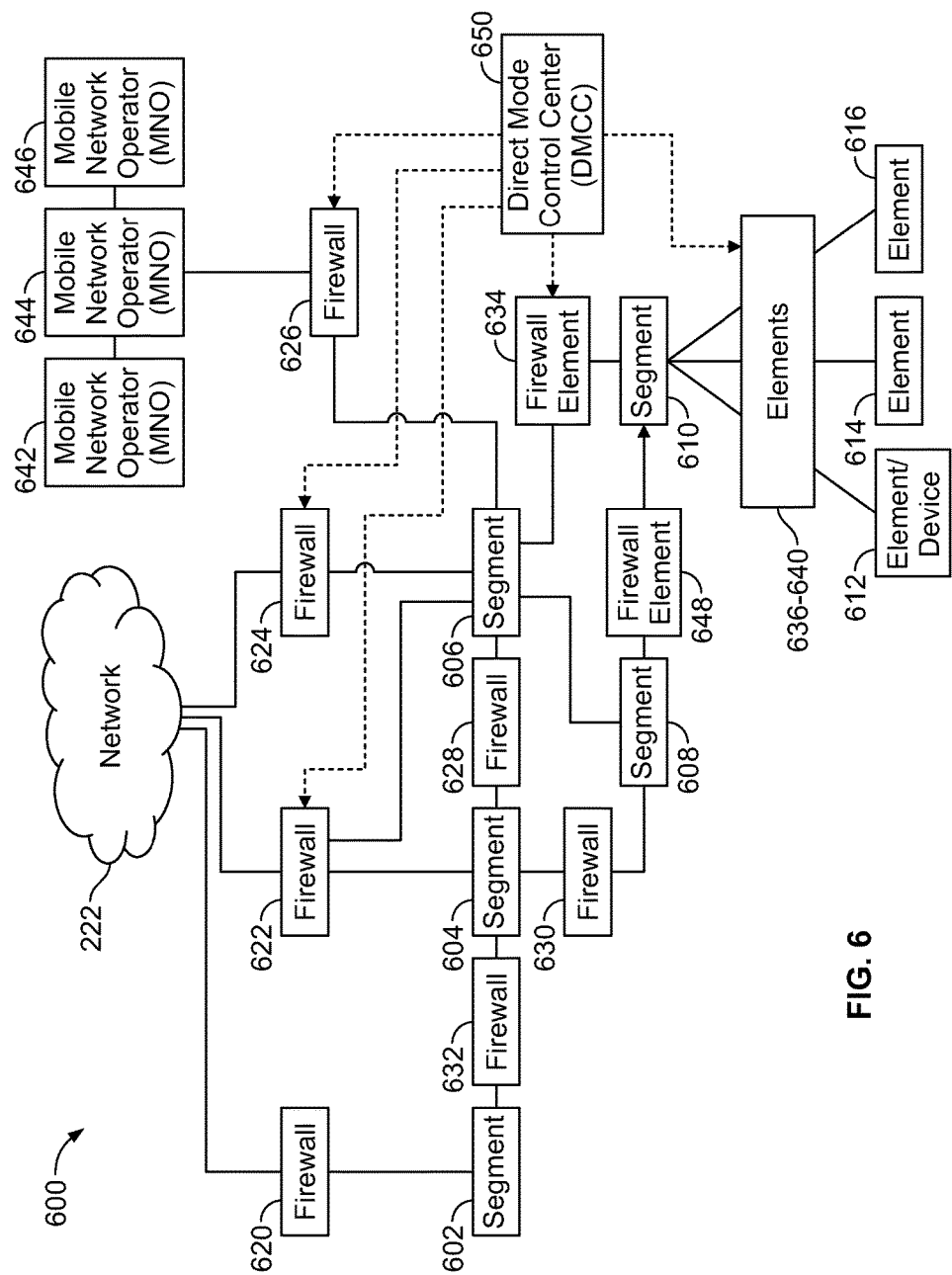
FIG. 6 provides a schematic illustration of a telecommunications system comprising multiple segments protected by multiple firewalls, according to one embodiment of the present invention.

In the discussion above it was assumed that the respective telecommunications networks are managed by a single firewall protecting a particular device. However, in practice, a device within a telecommunications network may be protected by multiple firewalls and be segmented to separate functions. Examples of different network segments of a telecommunications network include having one network segment for all of the machines involved in the billing process, another segment for the machines that are used to do configuration management, another segment for testing purposes, yet another one for general office usage, etc. An example of a portion of such a telecommunications network 600 is provided in FIG. 6. In FIG. 6, an office segment of the telecommunications network 600 is shown as a segment 602. Another segment, shown as a segment 604, could be a segment that contains the machines that administrators use for their daily activities. A segment 606 could be a segment comprising network elements that form a core network, such as e.g. the core network 104 of FIG. 1. A segment 608 could be a segment comprising the machines that are involved in signaling and billing related activities. A segment 610 could then be a segment comprising network elements that provide connectivity, such as a radio access network, such as e.g. the RAN 102. Elements 612, 614, and 616 shown in FIG. 6 illustrate user devices for different access technologies. In such a network, multiple firewalls are present. As illustrated in FIG. 6, a firewall 620 could be configured to protect the office network segment 602 in accessing the external network 222 of FIG. 2, a firewall 622 could be configured to protect the administrative network segment 604 and the core network segment 606, a firewall 624 may be configured to run in parallel to the firewall 622 but be only configured to protect the core network segment 606, and a firewall 626 could be configured to protect the core network segment 606 for traffic between the different MNOs (shown in FIG. 6 as MNOs 642, 644 and 646), if the different MNOs are connected on a dedicated network. Further, as also shown in FIG. 6, a firewall 628 could be configured to make sure that the core network elements of the segment 606 can be controlled by the administrators working from the segment 604, a firewall 630 could be configured to do the same for the billing segment 608, while a firewall 632 could be configured to do the same for the office segment 602. The elements 636-640 are the firewalls that prevent devices within the specific radio access networks for communicating with each other directly. The elements 634 and 648 are firewalls regulating the traffic between the radio access network and the core network and between the radio access network and the billing segment, respectively.

In such a network, the general principles described herein still apply. The DMCC(s) of such a telecommunications network, shown as an element 650, which could e.g. be implemented in the network segment 608, may then configure multiple firewalls, preferably substantially simultaneously. Thus, if the device 612 is to be made available for direct communication for a device coming from the MNO 642, the DMCC 650 will have to inform the firewalls 634, 636 and 626 of the incoming traffic and the required configuration. This may be done by either informing each firewall individually or informing all firewalls at once by a policy change. The latter is a commonly employed technology for firewall configuration.

Figure 7:
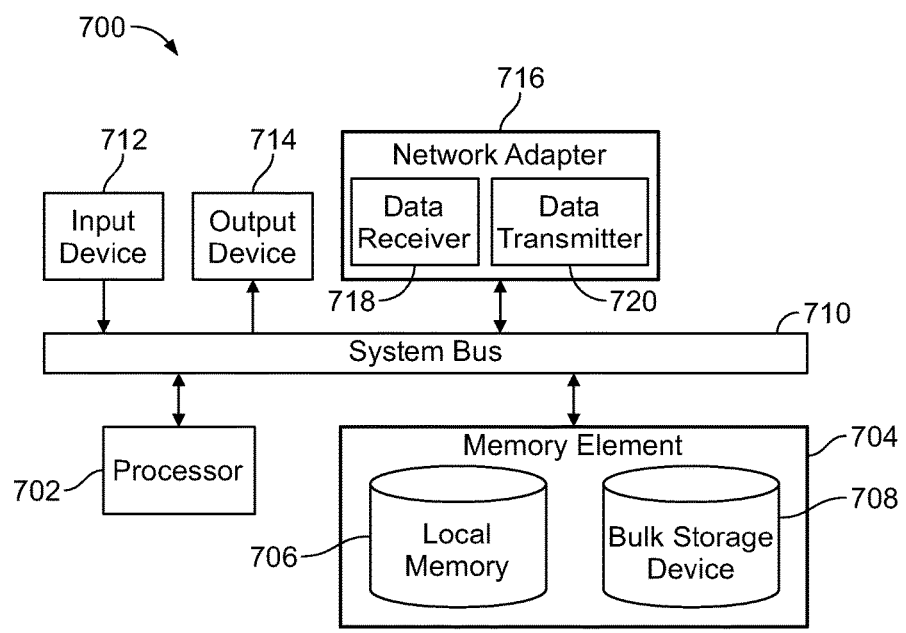
FIG. 7 shows a block diagram illustrating an exemplary data processing system that may be used in assisting in the establishment of an infrastructure-based D2D connection between the first and second devices according to embodiments of the present disclosure.

For each entity involved in performing steps of the methods 300, 400, and 500, such as e.g. the first routing entity 210, the second routing entity 220, the first device 202, or the second device 212, respective steps performed by such an entity may be performed by any kind of a data processing system that includes at least a processor or a microprocessor configured to carry out the respective steps of the method 300. An example of such a data processing system is illustrated in FIG. 7. Furthermore, while the method steps 300, 400, and 500 are described in conjunction with FIG. 2 and, in particular, with references to DMCCs as examples of first and second routing entities, persons skilled in the art will recognize that any system configured to perform the method steps, in any order, is within the scope of the present invention.

FIG. 7 shows a block diagram illustrating an exemplary data processing system 700 that may be used in assisting in establishing of an infrastructure-based D2D connection between the first and second devices according to embodiments of the present disclosure.

As shown in FIG. 7, the data processing system 700 may include at least one processor 702 coupled to memory elements 704 through a system bus 710. As such, the data processing system may store program code within memory elements 704. Further, the processor 702 may execute the program code accessed from the memory elements 704 via the system bus 710. In one aspect, the data processing system 700 may be implemented as a computer that is suitable for storing and/or executing program code. It should be appreciated, however, that the system 700 may be implemented in the form of any system including a processor and memory that is capable of performing the functions described within this specification.

The memory elements 704 may include one or more physical memory devices such as, for example, local memory 706 and one or more bulk storage devices 708. Local memory may refer to random access memory or other non-persistent memory device(s) generally used during actual execution of the program code. A bulk storage device may be implemented as a hard drive or other persistent data storage device. The processing system 700 may also include one or more cache memories (not shown) that provide temporary storage of at least some program code in order to reduce the number of times program code must be retrieved from the bulk storage device 708 during execution.

Input/output (I/O) devices depicted as an input device 712 and an output device 714 optionally could be coupled to the data processing system. Examples of input device may include, but are not limited to, for example, a keyboard, a pointing device such as a mouse, or the like. Examples of output device may include, but are not limited to, for example, a monitor or display, speakers, or the like. The system 700 could also include a combined input/output device, e.g. in a form of a touch-sensitive (also referred to as a "touchscreen") display capable of displaying information and receiving user input in a form of user interaction with the display, possibly by means of a stylus or user's finger. Such an embodiment may be particularly useful if the data processing system 700 is configured to function as the UE 106 or a part thereof.

The input device and/or output device(s) may be coupled to data processing system either directly or through intervening I/O controllers.

A network adapter 716 may also be coupled to data processing system to enable it to become coupled to other systems, computer systems, remote network devices, and/or remote storage devices through intervening private or public networks. The network adapter may, in particular, comprise a data receiver 718 for receiving data that is transmitted by said systems, devices and/or networks to said data and a data transmitter 720 for transmitting data to said systems, devices and/or networks. Modems, cable modems, and Ethernet cards are examples of different types of network adapter that may be used with the data processing system 700.

The memory elements 704 may store an application (not shown). It should be appreciated that the data processing system 700 may further execute an operating system (not shown) that can facilitate execution of the application. The application, being implemented in the form of executable program code, can be executed by the data processing system 700, e.g., by the processor 702. Responsive to executing the application, the data processing system 700 may be configured to perform one or more method steps described herein, e.g. as the DMCC 210, the DMCC 220, the first device 202 or the second device 212.

Persons skilled in the art will recognize that while the elements 702-720 are shown in FIG. 7 as separate elements, in other embodiments their functionality could be implemented in lesser number of individual elements or distributed over a larger number of components.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 1202 described herein.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method for a first routing entity controlled by a first mobile network operator to enable establishment of a connection between a first device connected to a telecommunications network of the first mobile network operator and a second device connected to a telecommunications network of a second mobile network operator, the method comprising:
   receiving from the first device a connection request comprising a first identifier for the second device;
   resolving the first identifier of the second device into a second identifier of the second device identifying a second routing entity controlled by the second mobile network operator;
   providing to the second routing entity a connection request for the connection between the first device and the second device, the connection request comprising at least one of the first identifier or the second identifier of the second device;
   providing to the second routing entity contact information of the first device;
   receiving from the second routing entity contact information of the second device; and
   configuring a first firewall for a data exchange over the connection between the first device and the second device in accordance with the contact information of the first device and the contact information of the second device, wherein the first firewall is a firewall of the telecommunications network to which the first device is connected that is configured to protect the first device.

2. The method according to claim 1, further comprising:
   receiving from the first device a command to terminate the connection; and
   instructing the first firewall to terminate the connection.

3. The method according to claim 1, further comprising steps of:
   receiving from the second routing entity an indication that the second device issued a command to terminate the connection; and
   at least one of instructing the first firewall to terminate the connection or providing an indication to the first device that the connection is to be terminated.

4. The method according to claim 1, wherein the contact information of the first device comprises a first IP address and the contact information of the second device comprises a second IP address.

5. The method of claim 4, wherein the contact information of the first device further comprises one or more ports of the first device to be used for communicating data over the connection and the contact information of the second device further comprises one or more ports of the second device to be used for communicating data over the connection.

6. A method for a second routing entity controlled by a second mobile network operator to enable establishment of a connection between a first device connected to a telecommunications network of a first mobile network operator and a second device connected to a telecommunications network of the second mobile network operator, the method comprising:
   receiving from a first routing entity controlled by the first mobile network operator a connection request for the connection between the first device and the second device, the connection request comprising at least one of a first identifier or a second identifier of the second device;
   resolving the at least one of the first identifier or the second identifier of the second device to determine a third identifier of the second device;
   providing the connection request, or a derivative thereof, to the second device identified by the third identifier;
   receiving, from the first routing entity, contact information of the first device;
   providing contact information of the second device to the first routing entity; and
   configuring a second firewall for a data exchange over the connection between the first device and the second device in accordance with the contact information of the first device and the contact information of the second device, wherein the second firewall is a firewall of the telecommunications network to which the second device is connected that is configured to protect the second device.

7. The method according to claim 6, further comprising steps of:
   receiving from the first routing entity an indication that the first device issued a command to terminate the connection between the first device and the second device; and
   at least one of instructing the second firewall to terminate the connection or providing an indication to the second device that the connection is to be terminated.

8. The method according to claim 6, further comprising steps of:
   receiving from the second device a command to terminate the connection; and
   instructing the second firewall to terminate the connection.

9. The method of claim 8, further comprising providing an indication to the first routing entity that the connection will be terminated.

10. The method of claim 6, further comprising receiving from the second device an indication that the second device accepts the connection request.

11. A non-transitory computer-readable storage medium having instructions stored thereon for a first routing entity controlled by a first mobile network operator to enable establishment of a connection between a first device connected to a telecommunications network of the first mobile network operator and a second device connected to a telecommunications network of a second mobile network operator, wherein the instructions, when executed by a processor of a node, cause the node to carry out operations including:
receiving from the first device a connection request comprising a first identifier for the second device;
resolving the first identifier of the second device into a second identifier of the second device identifying a second routing entity controlled by the second mobile network operator;
providing to the second routing entity a connection request for the connection between the first device and the second device, the connection request comprising at least one of the first identifier or the second identifier of the second device;
providing to the second routing entity contact information of the first device;
receiving from the second routing entity contact information of the second device; and
configuring a first firewall for a data exchange over the connection between the first device and the second device in accordance with the contact information of the first device and the contact information of the second device, wherein the first firewall is a firewall of the telecommunications network to which the first device is connected that is configured to protect the first device.

12. A node comprising:
a non-transitory computer readable storage medium having computer readable instructions stored thereon for a first routing entity controlled by a first mobile network operator to enable establishment of a connection between a first device connected to a telecommunications network of the first mobile network operator and a second device connected to a telecommunications network of a second mobile network operator; and
a processor coupled to the non-transitory computer readable storage medium, wherein responsive to executing the computer readable instructions, the processor is configured to cause the node to carry out operations including:
receiving from the first device a connection request comprising a first identifier for the second device;
resolving the first identifier of the second device into a second identifier of the second device identifying a second routing entity controlled by the second mobile network operator;
providing to the second routing entity a connection request for the connection between the first device and the second device, the connection request comprising at least one of the first identifier or the second identifier of the second device;
providing to the second routing entity contact information of the first device;
receiving from the second routing entity contact information of the second device; and
configuring a first firewall for a data exchange over the connection between the first device and the second device in accordance with the contact information of the first device and the contact information of the second device, wherein the first firewall is a firewall of the telecommunications network to which the first device is connected that is configured to protect the first device.

13. A node comprising:
a non-transitory computer readable storage medium having computer readable instructions stored thereon for a second routing entity controlled by a second mobile network operator to enable establishment of a connection between a first device connected to a telecommunications network of a first mobile network operator and a second device connected to a telecommunications network of the second mobile network operator; and
a processor coupled to the non-transitory computer readable storage medium, wherein responsive to executing the computer readable instructions, the processor is configured to cause the node to carry out operations including:
receiving from a first routing entity controlled by the first mobile network operator a connection request for the connection between the first device and the second device, the connection request comprising at least one of a first identifier or a second identifier of the second device;
resolving the at least one of the first identifier or the second identifier of the second device to determine a third identifier of the second device;
providing the connection request, or a derivative thereof, to the second device identified by the third identifier;
receiving, from the first routing entity, contact information of the first device;
providing contact information of the second device to the first routing entity; and
configuring a second firewall for a data exchange over the connection between the first device and the second device in accordance with the contact information of the first device and the contact information of the second device, wherein the second firewall is a firewall of the telecommunications network to which the second device is connected that is configured to protect the second device.

* * * * *